(12) United States Patent
Petroski Such et al.

(10) Patent No.: US 10,599,975 B2
(45) Date of Patent: Mar. 24, 2020

(54) SCALABLE PARAMETER ENCODING OF ARTIFICIAL NEURAL NETWORKS OBTAINED VIA AN EVOLUTIONARY PROCESS

(71) Applicant: Uber Technologies, Inc., San Francisco, CA (US)

(72) Inventors: Felipe Petroski Such, San Francisco, CA (US); Jeffrey Michael Clune, San Francisco, CA (US); Kenneth Owen Stanley, San Francisco, CA (US); Edoardo Conti, San Francisco, CA (US); Vashisht Madhavan, San Francisco, CA (US); Joel Anthony Lehman, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/220,525

(22) Filed: Dec. 14, 2018

(65) Prior Publication Data

US 2019/0188553 A1 Jun. 20, 2019

Related U.S. Application Data

(60) Provisional application No. 62/599,600, filed on Dec. 15, 2017.

(51) Int. Cl.
*G06N 3/04* (2006.01)
*G06N 3/08* (2006.01)
(Continued)

(52) U.S. Cl.
CPC ............... *G06N 3/04* (2013.01); *G06N 3/008* (2013.01); *G06N 3/08* (2013.01); *G06N 3/082* (2013.01);
(Continued)

(58) Field of Classification Search
CPC ............. G06N 3/04; G06N 3/126; G06N 3/08
See application file for complete search history.

(56) References Cited

U.S. PATENT DOCUMENTS 5,940,825 A * 8/1999 Castelli .................. G01V 1/288
9,424,514 B2 8/2016 Weng et al.
(Continued)

OTHER PUBLICATIONS

"Richa Mahajan, Neural Networks using Genetic Algorithms Sep. 2013, IJCA, vol. 77—No. 14" (Year: 2013).*
(Continued)

*Primary Examiner* — Kamran Afshar
*Assistant Examiner* — Imad Kassim
(74) *Attorney, Agent, or Firm* — Fenwick & West LLP

(57) ABSTRACT

A source system initializes, using an initialization seed, a first parameter vector representing weights of a neural network. The source system determines a second parameter vector by performing a sequence of mutations on the first parameter vector, the mutations each being based on a perturbation seed. The source system generates, and stores to memory, an encoded representation of the second parameter vector that comprises the initialization seed and a sequence of perturbation seeds corresponding to the sequence of mutations. The source system transmits the data structure to a target system, which processes a neural network based on the data structure.

20 Claims, 7 Drawing Sheets

(51) Int. Cl.
G06N 3/00 (2006.01)
G06N 3/12 (2006.01)
(52) U.S. Cl.
CPC ............. *G06N 3/084* (2013.01); *G06N 3/086* (2013.01); *G06N 3/126* (2013.01)

(56) References Cited

U.S. PATENT DOCUMENTS

| | | | |
|---|---|---|---|
| 9,619,748 | B1 | 4/2017 | Commons et al. |
| 9,715,870 | B2 | 7/2017 | Hwang et al. |
| 9,753,959 | B2* | 9/2017 | Birdwell ................ G06F 16/22 |
| 2002/0138457 | A1* | 9/2002 | Jin ........................ G06N 3/126 706/26 |
| 2016/0342889 | A1 | 11/2016 | Thorson et al. |
| 2017/0140259 | A1* | 5/2017 | Bergstra ................... B25J 9/161 |
| 2017/0255688 | A1 | 9/2017 | Hackett-Jones et al. |
| 2017/0255859 | A1* | 9/2017 | Tan .......................... G06N 3/02 |
| 2018/0005082 | A1* | 1/2018 | Bluche ............... G06K 9/00409 |
| 2018/0046905 | A1* | 2/2018 | Li .......................... G06N 3/0454 |
| 2018/0075347 | A1* | 3/2018 | Alistarh ................. G06N 3/084 |
| 2018/0137877 | A1* | 5/2018 | Du ............................. H04R 3/00 |
| 2018/0181802 | A1* | 6/2018 | Chen .................. G06K 9/00201 |
| 2018/0373987 | A1* | 12/2018 | Zhang ..................... G06N 3/084 |
| 2019/0122110 | A1* | 4/2019 | Ruckauer ................. G06N 3/08 |
| 2019/0138878 | A1* | 5/2019 | Delong .................. G16B 99/00 |

OTHER PUBLICATIONS

"Paulito P. Palmes, Mutation-Based Genetic Neural Network, May 2005,IEEE, vol. 16, pp. 587-600" (Year: 2005).*
Eiben, A. E. et al., "Introduction to Evolutionary Computing," Springer-Verlag, 2003, pp. 1-299.
Bellemare, M. et al., "A distributional perspective on reinforcement learning," Proceedings of the 34th International Conference on Machine Learning, Aug. 2017, pp. 1-19.
Bellemare, M. et al., "The arcade learning environment: An evaluation platform for general agents," J. Artif Intell. Res., vol. 47, Jun. 2013, pp. 253-279.
Brockman, G. et al., "OpenAI gym," Jun. 5, 2016, pp. 1-4.
Caponetto, R. et al., "Chaotic sequences to improve the performance of evolutionary algorithms," IEEE Transactions on Evolutionary Computation, vol. 7, No. 3, Jun. 2003, pp. 289-304.
Cho, K. et al., "On the properties of neural machine translation: Encoder-decoder approaches," Oct. 7, 2014, pp. 1-9.
Clune, J. et al., "Natural selection fails to optimize mutation rat.es for longterm adaptation on rugged fitness landscapes," PLoS Computational Biology, vol. 4, Iss. 9, Sep. 2008, pp. 1-8.
Clune, J. et al., "On the performance of indirect encoding across the continuum of regularity," IEEE Transactions on Evolutionary Computation, vol. 15, Iss. 3, Jun. 2011, pp. 346-367.
Conti, E. et al., "Improving exploration in evolutionary strategies for deep reinforcement leanung via a population of novelty-seeking agents," 32nd Conference on Neural Information Processing Systems, Dec. 2018, pp. 1-18.
Cully, A. et al., "Robots that can adapt like animals," Nature, vol. 521, May 2015, pp. 503-507.
Deb, K. et al., "Breaking the billion-variable ba1Tier in real-world optimization using a custonuzed evolutionary algorithm," Proceedings of the 2016 on Genetic and Evolutionary Computation Conference, Jul. 2016, pp. 653-660.
Fogel, D. et al., "On the effectiveness of crossover in simulated evolutionary optimization," BioSystems, 32(3), 1994, pp. 171-182.
Fortunato, M. et al., "Noisy networks for exploration," Sixth International Conference on Learning Representations, May 2018, pp. 1-21.
Glorot, X. et al., "Understanding the difficulty of training deep feedforward neural networks," Proceedings of the Thirteenth International Conference on Artificial Intelligence and Statistics, May 2010, pp. 249-256.
Haupt, R. et al., "Practical genetic algorithms," John Wiley & Sons, 2004, pp. 1-261.
He, K. et al., "Deep residual learning for image recognition," mXiv preprint a,Xiv:1512.03385, Dec. 10, 2015, pp. 1-12.
Hessel, M. et al., "Rainbow: Combining improvements in deep reinforcement learning," 32nd AAAI Conference on Artificial Intelligence, Feb. 2018, pp. 3215-3222.
Hochreiter, S. et al., "Long shortterm memory," Neural computation, 9(8), 1997, pp. 1735-1780.
Hoerl, A. et al., "Ridge regression: Biased estimation for nonorthogonal problems," Technomerrics, vol. 12, No. 1, Feb. 1970, pp. 55-67.
Holland, J., "Genetic Algorithms," Scientific American, vol. 267, No. 1, Jul. 1992, pp. 66-72.
Huizinga, J. et al., "Does aligning phenotypic and genotypic modularity improve the evolution of neural networks?," Proceedings of the 2016 on Genetic and Evolutionary Computation Conference, Jul. 2016, pp. 125-132.
Kingma, D. et al., "Adam: A method for stochastic optimization," International Conference on Learning Representations, May 2015, pp. 1-15.
Klambauer, G. et al., "Self-normalizing neural networks," 31st Conference on Neural Informational Processing Systems, Dec. 2017, pp. 1-102.
Krizhevsky, A. et al., "Imagenet classification with deep convolutional neural networks," Advances in Neural Information Processing Systems, Dec. 2012, pp. 1097-1105.
Lehman, J. et al. "Exploiting openendedness to solve problems through the search for novelty," Proceedings of the Eleventh International Conference on Artificial Life (Alife XI), Jan. 2008, pp. 1-8.
Lehman, J. et al., "Abandoning objectives: Evolution through the search for novelty alone," Evolutionary Computation, vol. 19, No. 2, May 2011, pp. 189-223.
Lehman, J. et al., "ES Is More Than Just a Traditional Finite-Difference Approximator," GECCO '18, Jul. 2018, pp. 1-9.
Lehman, J. et al., "Evolving a diversity of virtual creatures through novelty search and local competition," GECCO '11: Proceedings of the 13th Annual Conference on Genetic and Evolutionary Computation, Jul. 2011, pp. 211-218.
Mnih, V. et al., "Asynchronous methods for deep reinforcement learning," International Conference on Machine Learning, Jun. 2016, pp. 1928-1937.
Mnih, V. et al., "Human-level control through deep reinforcement learning," Nature, vol. 518, Iss. 7540, Feb. 2015, pp. 529-533.
Mouret, J. et al., "Overcoming the bootstrap problem in evolutionary robotics using behavioral diversity," Proceedings of the IEEE Congress on Evolutionary Computation (CEC-2009), May 2009, pp. 1161-1168.
Nair, A. et al., "Massively parallel methods for deep reinforcement learning," International Conference on Machine Learning, Jul. 2015, pp. 1-14.
Osband, I. et al., "Deep exploration via bootstrapped dqn," 30th Conference on Neural Information Processing Systems, Dec. 2016, pp. 4026-4034.
Pascanu, R. et al., "On the saddle point problem for nonconvex optimization," May 28, 2014, pp. 1-12.
PCT International Search Report and Written Opinion, PCT Application No. PCT/162018/060142, Apr. 12, 2019, ten pages.
Plappert, M. et al., "Parameter space noise for exploration," Sixth International Conference on Learning Representations, May 2018, pp. 1-18.
Pugh, J. et al., "Quality diversity: A new frontier for evolutionary computation," Frontiers in Robotics and AI, vol. 3, Article 40, Jul. 2016, pp. 1-17.
Robbins, H. et al., "A stochastic approximation method," The Annals of Mathematical Statistics, vol. 22, No. 3, Sep. 1951, pp. 400-407.
Salimans, T. et al., "Evolution strategies as a scalable alternative to reinforcement learning," arXiv preprint arXiv:1703.03864, Sep. 7, 2017, pp. 1-13.
Salimans, T. et al., "Improved techniques for training gans," Advances in Neural Information Processing Systems, Dec. 2016, pp. 2234-2242.

(56) References Cited

OTHER PUBLICATIONS

Schaul, T. et al., "Prioritized experience replay," International Conference on Learning Representations, May 2016, pp. 1-21.

Schulman, J. et al., "Proximal policy optimization algorithms," arXiv preprint arXiv:1707.06347, Aug. 28, 2017, pp. 1-12.

Schulman, J. et al., "Trust region policy optimization," Proceedings of the 32nd International Conference on Machine Learning, Jul. 2015, pp. 1889-1897.

Sehnke, F. et al., "Parameter-exploring policy gradients," Neural Networks, vol. 23, Iss. 4, May 2010, pp. 551-559.

Seide, F. et al., "Conversational speech transcription using context-dependent deep neural networks," Interspeech 2011, Aug. 2011, pp. 437-440.

Srivastava, N. et al., "Dropout: A simple way to prevent neural networks from overfitting," The Journal of Machine Learning Research, vol. 15, No. 1, Jun. 2014, pp. 1929-1958.

Stanley, K. et al., "A hypercube-based indirect encoding for evolving large-scale neural networks," Artificial Life, vol. 15, No. 2, Mar. 2009, pp. 185-212.

Stanley, K., "Compositional pattern producing networks: A novel abstraction of development," Genetic Programming and Evolvable Machines Special Issue on Developmental Systems, 8(2), Jun. 2007, pp. 131-162.

Sutton, R. et al., "Reinforcement learning: An introduction," MIT press Cambridge, 2014, pp. 1-338.

Van Hasselt, H. et al., "Deep reinforcement learning with double q-learning," Proceedings of the 30th AAAI Conference on Arificial Intelligence, Feb. 2016, pp. 2094-2100.

Wang, Z. et al., "Dueling network architectures for deep reinforcement learning," arXiv preprint arXiv:1511.06581, Apr. 2016, pp. 1-15.

Watkins, C. et al., "Q-learning," Machine learning, vol. 8, Issue 3-4, May 1992, pp. 279-292.

Wierstra, D. et al., "Natural evolution strategies," 2008 IEEE Congress on Evolutionary Computation (IEEE World Congress on Computational Intelligence), Jun. 2008, pp. 3381-3387.

Williams, R., "Simple statistical gradient-following algorithms for connectionist reinforcement learning," Machine learning, vol. 8, Issue 3-4, May 1992, pp. 229-256.

Wu, Y. et al., "Scalable trust-region method for deep reinforcement learning using kronecker-factored approximation," 31st Conference on Neural Information Processing Systems (NIPS 2017), Dec. 2017, pp. 5285-5294.

\* cited by examiner

SCALABLE PARAMETER ENCODING OF ARTIFICIAL NEURAL NETWORKS OBTAINED VIA AN EVOLUTIONARY PROCESS

CROSS-REFERENCE TO RELATED APPLICATIONS

The instant application claims the benefit of U.S. Provisional Patent Application No. 62/599,600, filed Dec. 15, 2017, the disclosure of which is hereby incorporated by reference herein in its entirety.

BACKGROUND

1. Technical Field

The subject matter described generally relates to artificial neural networks, and in particular to scalable parameter encoding of artificial neural networks obtained via an evolutionary process.

2. Background Information

Artificial neural networks (or neural networks) are used for performing complex tasks, for example, natural language processing, computer vision, speech recognition, bioinformatics, recognizing patterns in images, and so on. A neural network is represented as a set of interconnected nodes. A neural network may comprise millions of parameters representing weights of the interconnections between nodes. Therefore representing large neural networks can occupy significant amount of storage. Furthermore, transmitting a neural network across the network can take large amount of bandwidth. Techniques for training neural networks that use a large population of neural networks are required to process several sets of parameters for the neural network. As a result, these techniques require a large amount of computer readable storage. Furthermore, distributed processing of these techniques is inefficient because a large amount of data representing parameters of the neural network needs to be transmitted across processors resulting in large communication overhead. Since each neural network is represented as millions of values, such distributed processing of training of neural networks represented using conventional techniques can be an inefficient process.

SUMMARY

Systems and methods are disclosed herein for improving efficiency involved in transmitting neural networks and data corresponding thereto. To this end, in some aspects of the disclosure, a source system (e.g., by way of a processor) initializes, using an initialization seed, a first parameter vector representing weights of a neural network. The source system determines a second parameter vector by performing a sequence of mutations on the first parameter vector, each mutation based on a perturbation seed, the sequence of mutations being in an order.

The source system then generates an encoded representation of the second parameter vector, the encoded representation comprising the initialization seed and a sequence of perturbation seeds, each perturbation seed of the sequence corresponding to a mutation from the sequence of mutations performed to obtain the second parameter vector from the first parameter vector, the sequence of perturbation seeds being in the order. In some embodiments, this generating is performed by the source system assigning a respective unique identifier to each mutation of the sequence of mutations (e.g., by mapping each unique identifier to a corresponding perturbation seed in an index), and denoting the sequence of perturbation seeds by listing a sequence of the respective unique identifiers in a manner corresponding to the order. The source system goes on to store the encoded representation to a data structure in memory and/or transmit the data structure to a target system. The target system receives the data structure, and then processes a neural network based on the data structure. In some embodiments, the target system processes the neural network by extracting the initialization seed from the data structure, and decoding the first parameter vector using the extracted initialization seed. The target system may further extract the sequence of perturbation seeds from the data structure, and decode the second parameter vector by performing the sequence of mutations to the decoded first parameter vector using the extracted sequence of perturbation seeds, the sequence of mutations being in the order.

The source system, when generating the encoded representation of the second parameter vector comprises, may assign a unique identifier to each generation that fed into, or resulted from, a mutation, may store each respective perturbation seed as a respective array that indicates a respective unique identifier for a respective parent generation and a respective unique identifier for a respective child generation of a mutation caused by the respective perturbation seed, and may generate the sequence of perturbation seeds using each respective array. In such embodiments, the target system, when processing the neural network based on the data structure, may decode the second parameter vector by determining what mutation is necessary to reach each respective unique identifier for a respective child generation from each respective unique identifier for a respective parent generation.

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practi-

DETAILED DESCRIPTION

Neural networks are a powerful tool in a wide range of technological fields, from medical diagnosis to spam filtering, and self-driving cars to ocean modelling. However, neural networks regularly have between tens of thousands and hundreds of millions of parameters (i.e., weights). In real world applications, this can cause problems with respect to both memory and network bandwidth requirements. In cases where the neural network is transmitted over the network, for example, for training the neural network using a parallel or distributed architecture, the bandwidth consumed by transmitting the neural network can also become a significant limiting factor.

Example Systems

Figure 1:
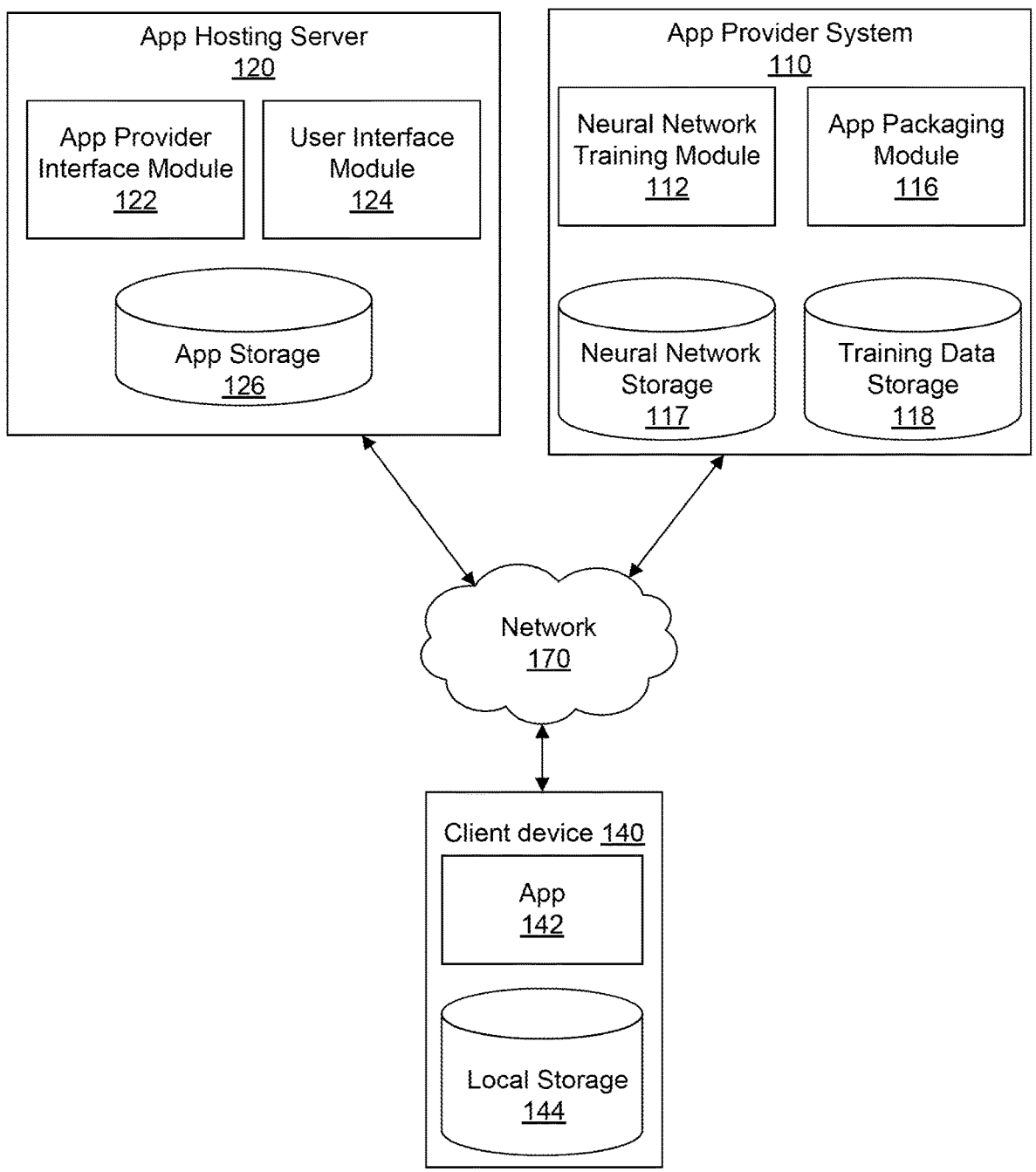
FIG. 1 is a high-level block diagram illustrating a networked computing environment in which neural networks may be used, according to an embodiment.

FIG. 1 illustrates one embodiment of a networked computing environment 100 in which neural network compression may be used. In the embodiment shown in FIG. 1, the networked computing environment 100 includes an application provider system 110, an application provider server 120, and a client device 140, all connected via a network 170. An application is also interchangeably referred to herein as an app. Although only one client device 140 is shown, in practice many (e.g., thousands or even millions of) client devices may be connected to the network 170 at any given time. In other embodiments, the networked computing environment 100 contains different and/or additional elements. In addition, the functions may be distributed among the elements in a different manner than described. For example, the client device 140 may obtain the application 142 directly from the application provider system 110, rather than from the application hosting server 120.

The application provider system 110 is one or more computer systems with which the provider of software (e.g., an application designed to run on a cell phone or tablet) develops that software. Although the application provider system 110 is shown as a single entity, connected to the network 170, for convenience, in many cases it will be made up from several software developer's systems (e.g., terminals) which may or may not all be network-connected.

In the embodiment shown in FIG. 1, the application provider system 110 includes a neural network training module 112, a neural network compression module 114, an application packaging module 116, neural network storage 117, and training data storage 118. In other embodiments, the application provider system 110 contains different and/or additional elements. In addition, the functions may be distributed among the elements in a different manner than described.

The neural network training module 112 is used to train full neural networks. In some embodiments, the neural network training module 112 takes a set of training inputs that have known outputs (e.g., stored in the training data storage 118) and divides it into a training set and a validation set. The neural network is then trained using the training set (e.g., using a backpropagation algorithm) and then tested against the validation set to determine its accuracy after training. This process may be repeated using variations in the structure of the neural network and the results of validation compared to identify a neural network that is likely to reliably make the intended determination when presented with input data for which the correct output is already known.

For example, a neural network might be intended to identify faces in photographs. The training and validation sets would contain a variety of faces and instances of images including no face at all. The network is trained by adjusting parameters (e.g., node weightings) to minimize a loss function (i.e., a measure of the number and/or degree of errors) that results from applying the network to the training set. Once the neural network has been trained, it is applied to the validation set and the degree to which it successfully identifies faces is recorded. If the network makes few or no errors when applied to the validation set, this is a strong indicator that the network will correctly identify faces in photographs that have not already been classified.

The app packaging module 116 takes a lower-order representation of a neural network and packages it into an app to be provided to client devices 140. For example, the app packaging module 116 might be used to create an app for booking and managing trips with a ride-sharing service. In one embodiment, the app might include a neural network configured to take various data available at the client device 140 and predict whether the device is currently inside a vehicle providing a ride. The full neural network may be too large to provide to client devices 140 over the network 170, so in some examples, the app instead includes a lower-order representation of the full neural network that is sufficiently accurate to perform its operations or provide a good user experience. Once packaged, the app is made available to client devices 140 (e.g., via the app hosting server 120).

The neural network storage 117 and training data storage 118 include one or more computer-readable storage-media that are configured to store neural networks and training data, respectively. Although they are shown as separate entities in FIG. 1, this functionality may be provided by a single computer-readable storage-medium (e.g., a hard drive).

The app hosting server 120 is one or more computers configured to store apps and make them available to client devices 140. In the embodiment shown in FIG. 1, the app hosting server 120 includes an app provider interface module 122, a user interface module 124, and app storage 126. In other embodiments, the app hosting server 120 contains different and/or additional elements. In addition, the functions may be distributed among the elements in a different manner than described.

The app provider interface module 122 provides an interface with which app providers (e.g., the operator of app provider system 110) can add apps to a marketplace or other on-line store to make them available to users (either free or for payment of value). In one embodiment, an app provider fills out an on-line form with basic information about the app (e.g., name, app provider name, version number, a short description of what it does, and the like) and uploads the app in an appropriate format. The app provider interface module 114 adds the app (along with metadata with some or all of the information provided about the app) to app storage 126. In some cases, the app provider information module 114 also performs validation actions, such as checking that the app does not exceed a maximum allowable size, scanning the app for malicious code, verifying the identity of the provider, and the like.

The user interface module 124 provides an interface to client devices 140 with which apps can be obtained. In one embodiment, the user interface module 124 provides a user interface using which the users can search for apps meeting various criteria from a client device 140. Once users find an app they want (e.g., one provided by the app provider system 110), they can download them to their client device 140 via the network 170.

The app storage 126 include one or more computer-readable storage-media that are configured to store apps and associated metadata. Although it is shown as a single entity in FIG. 1, the app storage 126 may be made up from several storage devices distributed across multiple locations. For example, in one embodiment, app storage 126 is provided by a distributed database and file storage system, with download sites located such that most users will be located near (in network terms) at least one copy of popular apps.

The client devices 140 are computing devices suitable for running apps obtained from the app hosting server 120 (or directly from the app provider system 110). The client devices 140 can be desktop computers, laptop computers, smartphones, PDAs, tablets, or any other such device. In the embodiment shown in FIG. 1, the client device 140 includes an application 142 and local storage 144. The application 142 is one that uses a neural network to perform a task, such as one created by the application provider system 110. The local data store 144 is one or more computer readable storage-media and may be relatively small (in terms of the amount of data that can be stored). Thus, the use of a compressed neural network may be desirable, or even required.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 2:
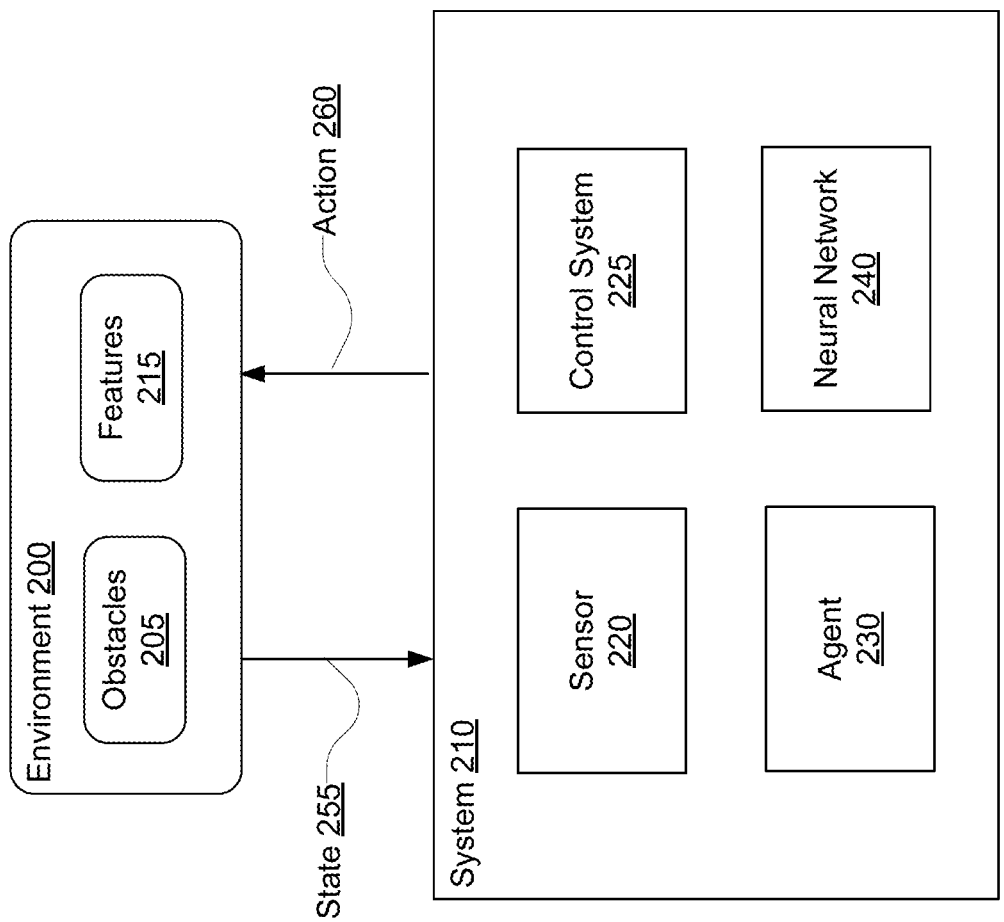
FIG. 2 illustrates a system environment comprising reinforcement learning based neural network, according to an embodiment.

FIG. 2 illustrates a system using reinforcement learning based neural network, according to one embodiment. The system 210 shown in FIG. 2 is a computing system that, depending on implementation, may be part of an apparatus or device, for example, a self-driving car or a robot. The environment 200 represents the surroundings of the system. For example, the environment 200 may represent a geographical region through which a self-driving car is travelling. Alternatively, the environment 200 may represent a maze or an obstacle course through which a robot is walking. As another example, the environment 200 may represent a setup of a game that the system 210 is playing, for example, an ATARI game.

The environment 210 may comprise obstacles 205 or features 215 that are detected by the system 210. The system 210 comprises one or more sensors (or input devices) 220, a control system 225, an agent 230, and a neural network 240. The system 210 uses the sensor 220 to sense the state 255 of the environment 200 and may perform certain actions 260. The actions 260 may cause the state of the environment to change. For example, the sensor 220 may be a camera that captures images of the environment. Other examples of sensors include a LIDAR, an infrared sensor, a motion sensor, a pressure sensor, or any other type of sensor that can provide information describing the environment 210 to the system 210. The agent 230 uses the neural network 240 to determine what action to take. The agent 230 sends signals to the control system 225 for taking the action 260. The neural network 240 is described in connection with FIG. 3.

For example, the sensors 220 of a robot may identify an object in the environment 200. The agent 230 of the robot invokes the neural network 240 to determine a particular action to take, for example, to move the object. The agent 230 of the robot sends signals to the control system 225 to move the arms of the robot to pick up the object and place it elsewhere. Similarly, a robot may use sensors to detect the obstacles surrounding the robot to be able to maneuver around the obstacles.

As another example, a self-driving car may capture images of the surroundings to determine a location of the self-driving car. As the self-driving car drives through the region, the location of the car changes and so do the surroundings of the car change. As another example, a system playing a game, for example, an ATARI game may use sensors to capture an image representing the current configuration of the game and make some move that causes the configuration of the game to change.

Figure 3:
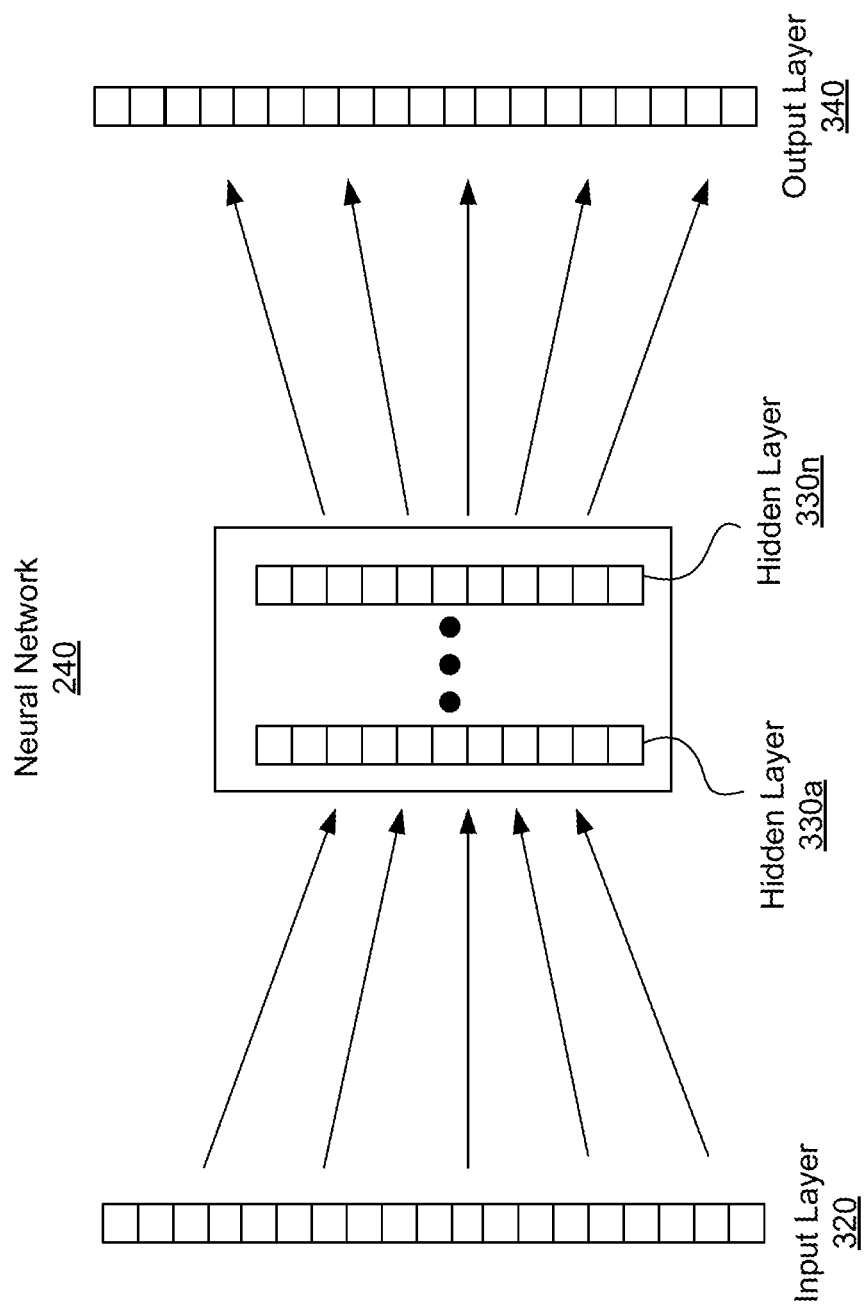
FIG. 3 is an example neural network, according to an embodiment.

FIG. 3 is an example neural network, according to one embodiment. The neural network 310 includes an input layer 320, one or more hidden layers 330a-n, and an output layer 340. In some examples, the neural network 310 of FIG. 3 can correspond to the neural network described in FIG. 1 or 2. Each layer of the neural network 310 (i.e., the input layer 320, the output layer 340, and the hidden layers 330a-n) comprises a set of nodes such that the set of nodes of the input layer 320 are input nodes of the neural network 310, the set of nodes of the output layer 340 are output nodes of the neural network 310, and the set of nodes of each of the hidden layers 330a-n are hidden nodes of the neural network 310.

Each node has one or more inputs and one or more outputs. Each of the one or more inputs to a node comprises a connection to an adjacent node in a previous layer and an output of a node comprises a connection to each of the one or more nodes in a next layer. The output of a node may be defined by an activation function that applies a set of weights to the inputs of the nodes of the neural network 310. In various embodiments, the output of a node is associated with a set of instructions corresponding to the computation performed by the node. Here, the set of instructions corresponding to the plurality of nodes of the neural network may be executed by one or more computer processors. The connections between nodes in the neural network 310 each is associated with a weight. In one or more embodiments, training the neural network 310 comprises adjusting values for weights of the neural network 310. The training of a neural network may be performed using a single processors based system or a parallel or distributed system that comprises a plurality of processors that interact with each other using interconnections between processors.

Distributed Architecture for Training Neural Network

Figure 4:
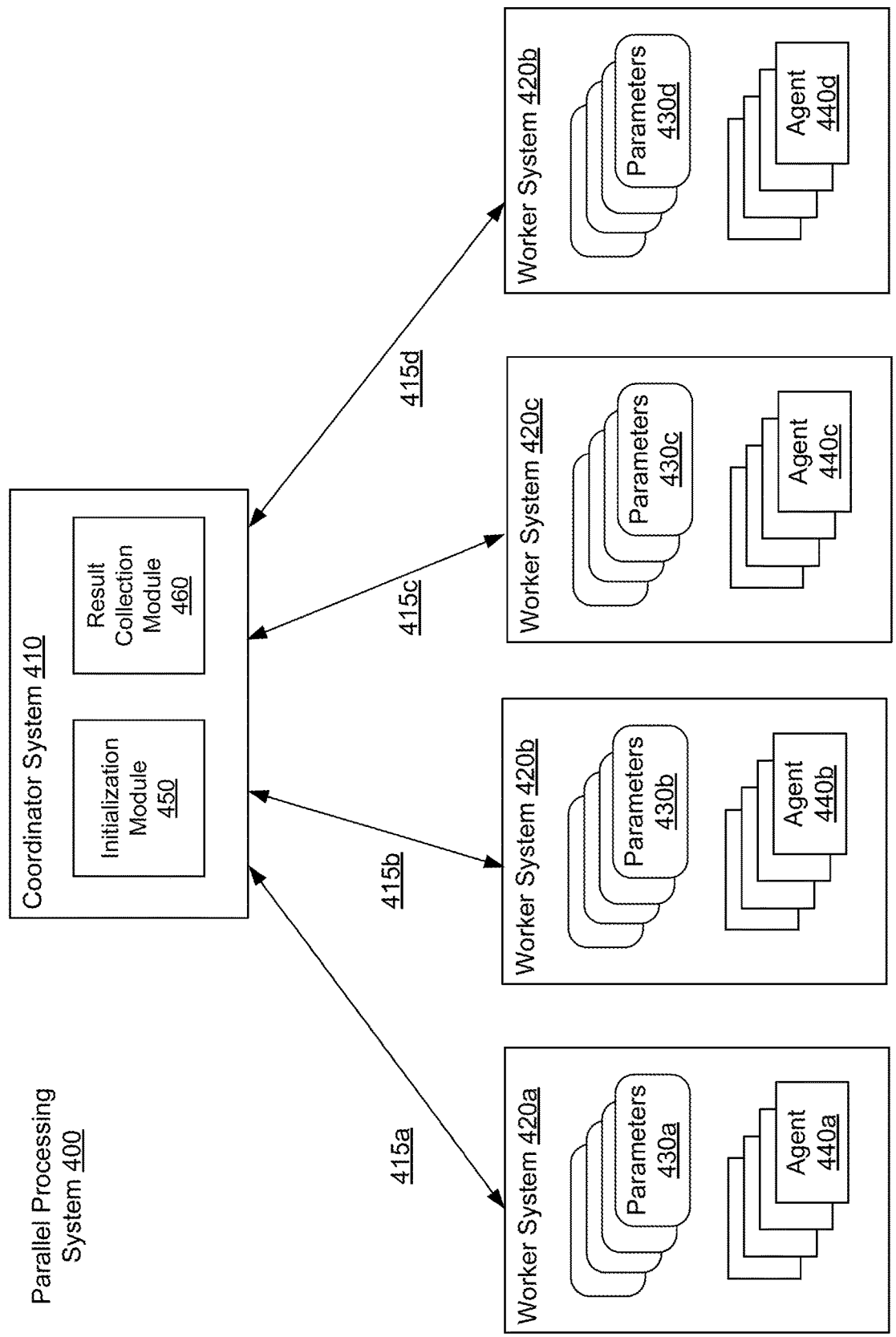
FIG. 4 is a parallel architecture for training a neural network, according to an embodiment.

FIG. 4 is an example parallel or distributed architecture for training a neural network, according to one embodiment. The parallel processing system 400 shown in FIG. 4 comprises a plurality of worker systems 420 and a coordinator system 410. The coordinator system 410 interacts 415 with the worker systems 420 to provide data, such as parameter vectors for processing and receives results based on processing performed by the worker systems 420.

The training of a neural network may be performed over a population of parameter vectors, each parameter vector representing a set of weights for a neural network. As shown in FIG. 4, each worker system 420 may process a subset of the population comprising one or more parameter vectors 430. Each worker system 420 includes one or more agents 440 that process corresponding parameter vectors. Components such as sensors and control systems are not shown in FIG. 4 but may be part of the worker systems or the coordinator system 410.

In one embodiment, the coordinator system 410 includes an initialization module 450 and a results collection module 460. Other embodiments may include more or different modules. The initialization module 450 initializes values that may be used by multiple worker systems. The results collection module 460 receives results from multiple worker systems, for example, for aggregating the results. For example, the coordinator system 410 may initialize a parameter vector (also referred to as a first parameter vector herein) and send it to one or more worker systems 420. Each worker system 420 performs perturbations of the parameter vector to determine new parameter vectors (also referred to as second parameter vectors herein) and evaluate them. The worker system 420 may send one or more new parameter vectors obtained by perturbing the initial parameter vector and send them as results to the coordinator system 410. In an embodiment, the coordinator system 410 and the worker systems 420 encode a parameter vector for sending to a target system that may be another worker system or coordinator system. The encoded representation of a parameter vector can be compressed and is efficient for transmitting over an interconnection network. The target system decodes the encoded parameter vector to obtain the parameter vector that was transmitted.

Embodiments of the invention perform encoding and decoding of neural networks. The encoding of a neural network allows efficient storage of the neural network. Accordingly, the encoded neural network occupies much smaller storage space compared to the original neural network. The encoding of neural networks also allows efficient transmission of neural network across the network. For example, encoding can be used by a worker system 420 for sending a neural network to a coordinator system 410. The coordinator system decodes the encoded neural network for further processing. Similarly, the coordinator system 410 can send encoded neural networks to the worker systems 420.

Figure 5:
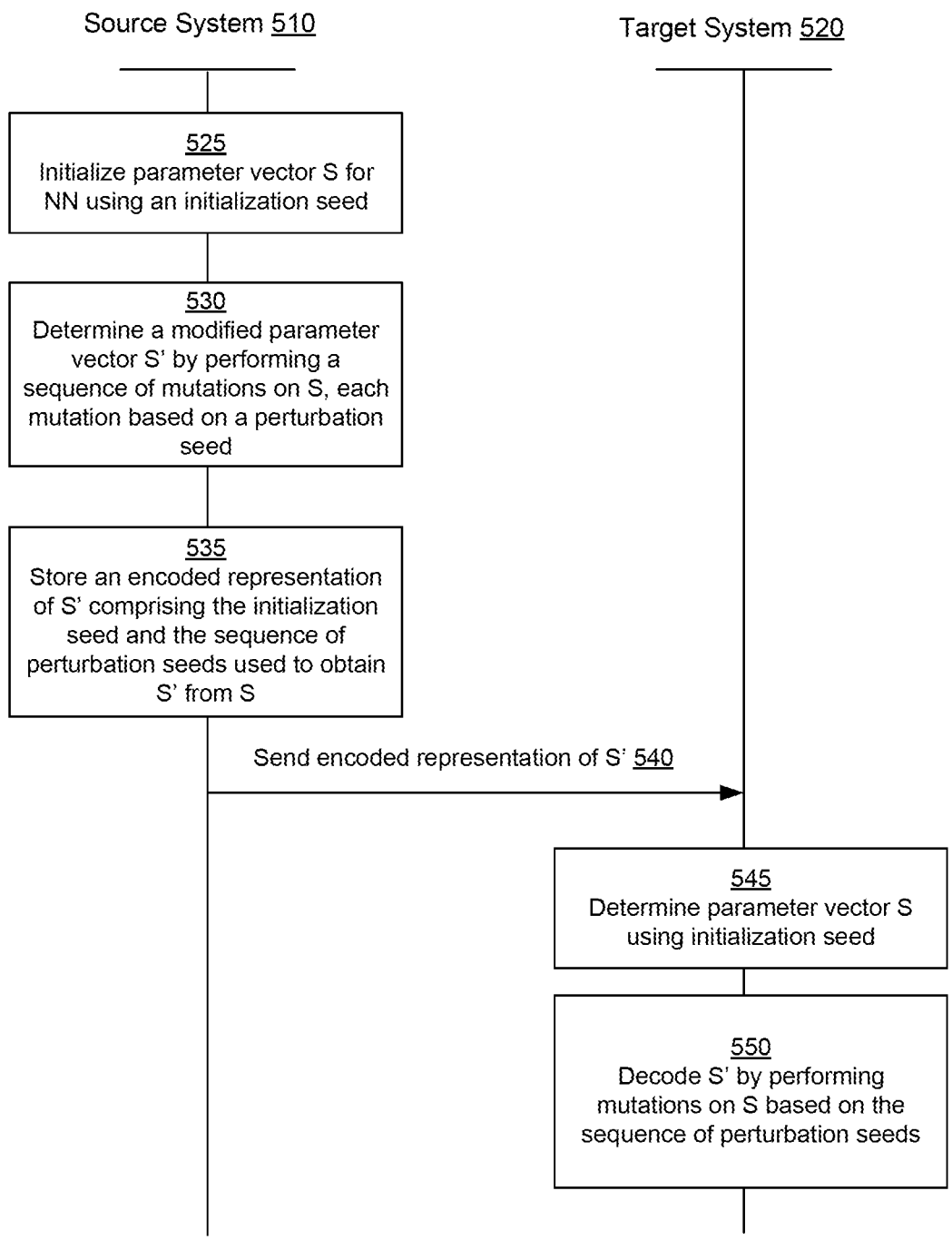
FIG. 5 is an interaction diagram illustrating the process of encoding and decoding parameter vectors of a neural network, according to an embodiment.

FIG. 5 is an interaction diagram illustrating the process of encoding and decoding the parameter vectors of a neural network, according to one embodiment. According to some examples, the process described in FIG. 5 can be performed by a computing system using reinforcement learning based neural networks, such as the system 210 of FIG. 2. As shown in FIG. 5, a source system 510 encodes a neural network and sends the encoded neural network to a target system 520. For example, the source system 510 can be a worker system 420 and the target system can be a coordinator system 410, or vice versa.

The source system 510 initializes 525 a parameter vector S for a neural network using an initialization seed. For example, the source system 510 may generate a sequence of random values based on the initialization seed and use them as parameters. The source system 510 determines 530 a modified parameter vector S' by performing a sequence of mutations on S. Each mutation is based on a perturbation seed value. For example, the source system 510 may modify the parameter vector S by generating a vector V representing a sequence of random values based on the perturbation seed. The source system 510 generates a modified parameter vector V' by performing a weighted aggregation of the vectors S and V. The source system 510 stores 535 an encoded representation of S' comprising the initialization seed and the sequence of perturbation seeds used to obtain S' from S. The source system 510 sends 540 the encoded representation of S' to a target system 520.

The target system 520 receives the encoded representation of S'. The target system 520 extracts the initialization seed from the encoded representation of the neural network and determines 545 the parameter vector S using the initialization seed. The target system 520 further extracts the sequence of the perturbation seeds from the encoded representation of the neural network received. The target system 520 decodes S' by performing mutations on S based on the sequence of perturbation seeds. Accordingly, the target system 520 obtains the same parameter vector S' as that stored at the source system 510 without having to transmit the entire parameter vector.

Figure 6:
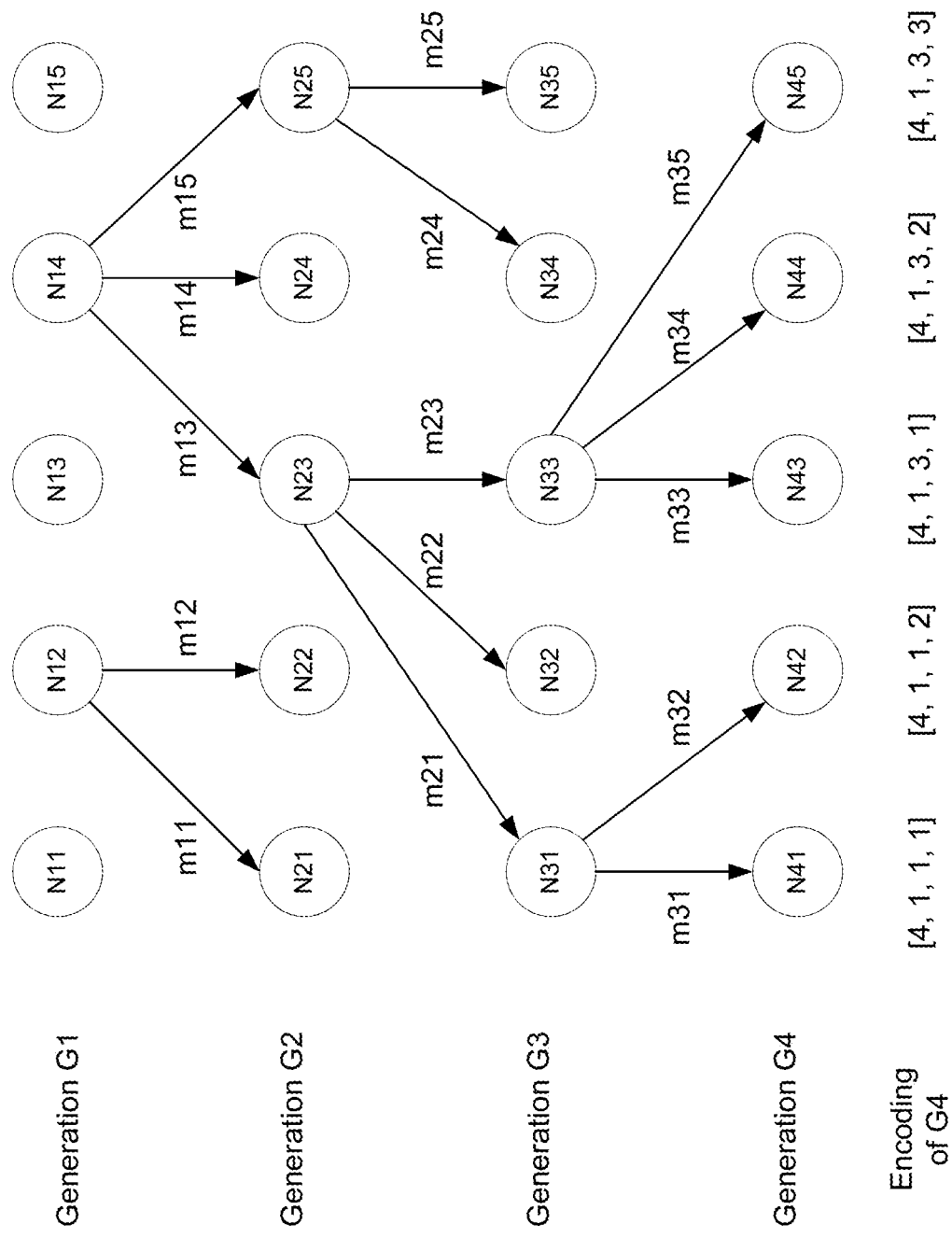
FIG. 6 illustrates the process of encoding a parameter vector for a neural network, according to an embodiment.

FIG. 6 illustrates the process of encoding a parameter vector for a neural network, according to an embodiment. According to some examples, the process described in FIG. 6 can be performed by a computing system using reinforcement learning based neural networks, such as the system 210 of FIG. 2. FIG. 6 shows a plurality of generations of parameter vectors identified as generation G1, G2, G3, and G4. Each generation has five parameter vectors representing neural networks. In other examples, there may be more or fewer generations. And typically each generation may have several hundreds, thousands, or more of parameter vectors. The node Nij represents the $j^{th}$ parameter vector for the $i^{th}$ generation. For example, N23 represents the $3^{rd}$ parameter vector of the 2nd generation. An arrow between two nodes represents a mutation.

Each mutation may be represented by the perturbation seed used to generate the mutation. Accordingly, noise values based on the perturbation seed are determined and added to a parameter vector. For example, m11 represents a mutation that obtains N21 from N12, m12 represents a mutation that obtains N22 from N12, m13 represents a mutation that obtains N23 from N14, and so on.

The encoding of a parameter vector is represented in terms of a sequence of mutations performed to obtain the parameter vector. For example, the encoding of node N41 may be represented as [N14, m13, m21, m31] indicating that N41 is obtained by applying mutations m13, m21, m31 to parameter vector N14. Each of the values N14, m13, m21, m31 may be identified using seed values, for example, N14 may be identified using an initial seed value and each mutation may be identified using a perturbation seed value. Similarly, the encoding of node N43 may be represented as [N14, m13, m33, m43] indicating that N41 is obtained by applying mutations m13, m33, m43 to parameter vector N14.

In another embodiment, the perturbation seeds for each generation are stored as an array, such that the index of the array represents the perturbation seed used to obtain that parameter vector. Furthermore, parent-child relations between nodes are stored, for example, as edges (N12, N21), (N12, N22), (N14, N23), (N14, N24), (N14, N25), and so on. These edges allow a decoder to determine parent parameter vector used to generate a child parameter vector, given the perturbation seed. Accordingly, the encoding of a parameter vector of a generation is performed by storing a sequence of indexes of parameter vectors of different generations used for obtaining the target parameter vector. For example, the encoding of node N44 is [4, 3, 3, 4] wherein the first value 4 represents the position of the parameter vector in the generation G1, the second value 3 represents the position of the parameter vector N23 in the generation G2, the third value 3 represents the position of the parameter vector N33 in the generation G3, and the fourth value 4 represents the position of the parameter vector N24 in the generation G4. Accordingly the encoding [4, 3, 3, 4] indicates that the parameter vector corresponding to node N44 was obtained by selecting the parameter vector N14, performing the mutation necessary to obtain N23, followed by the mutation necessary to obtain N33, followed by the mutation necessary to obtain N44.

The encoding of G4 shown in FIG. 6 represents an embodiment in which the encoding stores for each parameter vector, an index of the child of the parent node. For example, encoding of N44 is [4, 1, 3, 2]. The first value 4 in the encoding indicates that the node N44 is obtained by starting with Node N14, the $4^{th}$ node in generation G1. The second value 1 in the encoding indicates performing the mutation necessary to obtain the first child of N14, i.e., node N23. The third value 3 in the encoding indicates performing the mutation necessary to obtain the third child of N23, i.e., node N33. The fourth value 2 in the encoding indicates performing the mutation necessary to obtain the second child of N33, i.e., node N44. After performing this sequence of mutation, the parameter vector corresponding to node N44 is obtained.

Computing System Architecture

Figure 7:
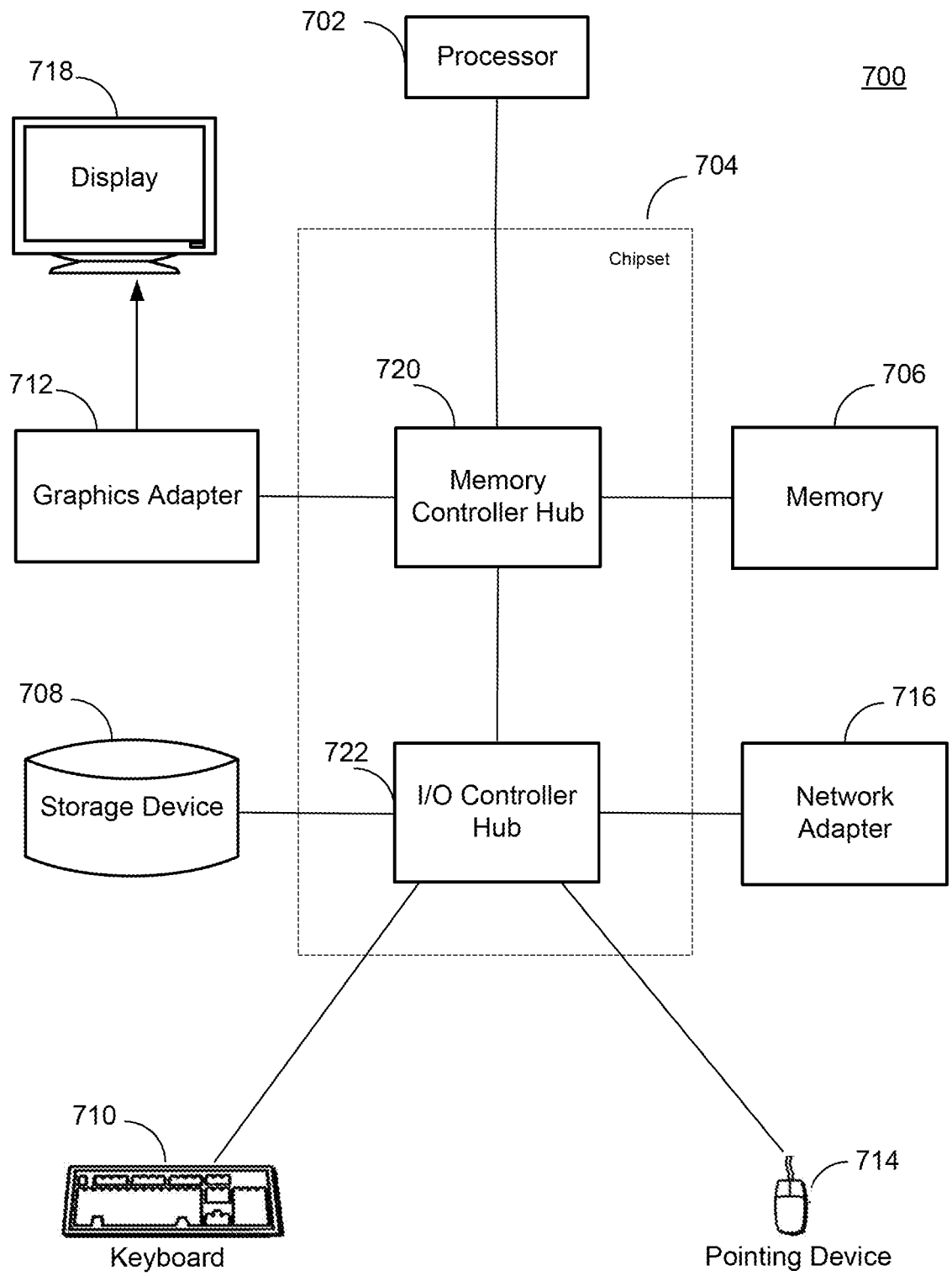
FIG. 7 is a high-level block diagram illustrating an example of a computer suitable for use in the system environment of FIG. 1-2, according to an embodiment.

FIG. 7 is a high-level block diagram illustrating an example computer 700 suitable for use as a client device 140, application hosting server 120, or application provider system 110. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and is used in combination with the keyboard 710 (which may be an on-screen keyboard) to input data into the computer system 700. The graphics adapter 712 displays images and other information on the display 718. The network adapter 716 couples the computer system 700 to one or more computer networks (e.g., network 170).

The types of computers used by the entities of FIG. 1 can vary depending upon the embodiment and the processing power required by the entity. For example, the application hosting server 120 might include a distributed database system comprising multiple blade servers working together to provide the functionality described. Furthermore, the computers can lack some of the components described above, such as keyboards 710, graphics adapters 712, and displays 718.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for compressing neural networks. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

We claim:

1. A computer-implemented method comprising:
   initializing, by a source system, using an initialization seed, a first parameter vector representing weights of a neural network;
   determining, by the source system, a second parameter vector by performing a sequence of mutations on the first parameter vector, each mutation based on a perturbation seed, the sequence of mutations being in an order;
   generating, by the source system, an encoded representation of the second parameter vector, the encoded representation comprising the initialization seed and a sequence of perturbation seeds, each perturbation seed of the sequence corresponding to a mutation from the sequence of mutations performed to obtain the second parameter vector, the sequence of perturbation seeds being in the order;
   storing the encoded representation to a data structure in memory; and
   transmitting, by the source system, the data structure to a target system.

2. The computer-implemented method of claim 1, further comprising:
   receiving, by the target system, the data structure; and
   processing, by the target system, a neural network based on the data structure by:
      extracting, by the target system, the initialization seed from the data structure; and
      decoding, by the target system, the first parameter vector using the extracted initialization seed.

3. The computer-implemented method of claim 2, wherein processing, by the target system, the neural network based on the data structure further comprises:
   extracting the sequence of perturbation seeds from the data structure; and
   decoding, by the target system, the second parameter vector by performing the sequence of mutations to the decoded first parameter vector using the extracted sequence of perturbation seeds, the sequence of mutations being in the order.

4. The computer-implemented method of claim 1, wherein generating, by the source system, the encoded representation of the second parameter vector comprises:
   assigning a respective unique identifier to each mutation of the sequence of mutations; and
   denoting the sequence of perturbation seeds by listing a sequence of the respective unique identifiers in a manner corresponding to the order.

5. The computer-implemented method of claim 4, wherein assigning the unique identifier to each mutation of the sequence of mutations further comprises mapping each unique identifier to a corresponding perturbation seed in an index.

6. The computer-implemented method of claim 1, wherein generating, by the source system, the encoded representation of the second parameter vector comprises:
   assigning a unique identifier to each generation that fed into, or resulted from, a mutation;
   storing each respective perturbation seed as a respective array that indicates a respective unique identifier for a respective parent generation and a respective unique identifier for a respective child generation of a mutation caused by the respective perturbation seed; and
   generating the sequence of perturbation seeds using each respective array.

7. The computer-implemented method of claim 6, wherein processing, by the target system, the neural network based on the data structure comprises decoding, by the target system, the second parameter vector by determining what mutation is necessary to reach each respective unique identifier for a respective child generation from each respective unique identifier for a respective parent generation.

8. A computer-implemented method comprising:
   initializing, by a source system, using an initialization seed, a first parameter vector representing weights of a neural network; and
   determining, by the source system, a second parameter vector by performing a sequence of mutations on the first parameter vector, each mutation based on a perturbation seed, the sequence of mutations being in an order;
   generating, by the source system, an encoded representation of the second parameter vector, the encoded representation comprising the initialization seed and a sequence of perturbation seeds, each perturbation seed of the sequence corresponding to a mutation from the sequence of mutations performed to obtain the second parameter vector, the sequence of perturbation seeds being in the order;
   storing, by the source system, the encoded representation to a data structure in memory; and
   transmitting, by the source system, to the target system, the data structure; wherein the target system processes a neural network based on the data structure.

9. The computer-implemented method of claim 8, wherein the target system processes the neural network by:
   extracting the initialization seed from the data structure; and
   decoding the first parameter vector using the extracted initialization seed.

10. The computer-implemented method of claim 9, wherein the target system processes the neural network by:
    extracting the sequence of perturbation seeds from the data structure; and
    decoding the second parameter vector by performing the sequence of mutations to the decoded first parameter vector using the extracted sequence of perturbation seeds, the sequence of mutations being in the order.

11. The computer-implemented method of claim 8, wherein generating, by the source system, the encoded representation of the second parameter vector comprises:
    assigning, by the source system, a respective unique identifier to each mutation of the sequence of mutations; and
    denoting, by the source system, the sequence of perturbation seeds by listing a sequence of the respective unique identifiers in a manner corresponding to the order.

12. The computer-implemented method of claim 11, wherein assigning the unique identifier to each mutation of the sequence of mutations further comprises mapping each unique identifier to a corresponding perturbation seed in an index.

13. The computer-implemented method of claim 8, wherein generating, by the source system, the encoded representation of the second parameter vector comprises:
    assigning, by the source system, a unique identifier to each generation that fed into, or resulted from, a mutation;
    storing, by the source system, each respective perturbation seed as a respective array that indicates a respective unique identifier for a respective parent generation and a respective unique identifier for a respective child generation of a mutation caused by the respective perturbation seed; and generating, by the source system, the sequence of perturbation seeds using each respective array.

14. The computer-implemented method of claim 13, wherein processing, by the target system, the neural network based on the data structure comprises decoding, by the target system, the second parameter vector by determining what mutation is necessary to reach each respective unique identifier for a respective child generation from each respective unique identifier for a respective parent generation.

15. A non-transitory computer-readable storage medium storing executable computer program code that, when executed by one or more processors, cause the one or more processors to perform operations comprising:
   initializing, by a source system, using an initialization seed, a first parameter vector representing weights of a neural network;
   determining, by the source system, a second parameter vector by performing a sequence of mutations on the first parameter vector, each mutation based on a perturbation seed, the sequence of mutations being in an order;
   generating, by the source system, an encoded representation of the second parameter vector, the encoded representation comprising the initialization seed and a sequence of perturbation seeds, each perturbation seed of the sequence corresponding to a mutation from the sequence of mutations performed to obtain the second parameter vector, the sequence of perturbation seeds being in the order;
   storing the encoded representation to a data structure in memory; and
   transmitting, by the source system, the data structure to a target system.

16. The non-transitory computer-readable storage medium of claim 15, wherein the executable program code, when executed by the one or more processors, further causes the one or more processors to perform operations comprising:
   receiving, by the target system, the data structure; and
   processing, by the target system, a neural network based on the data structure by:
      extracting, by the target system, the initialization seed from the data structure; and
      decoding, by the target system, the first parameter vector using the extracted initialization seed.

17. The non-transitory computer-readable storage medium of claim 16, wherein processing, by the target system, the neural network based on the data structure further comprises:
   extracting the sequence of perturbation seeds from the data structure; and
   decoding, by the target system, the second parameter vector by performing the sequence of mutations to the decoded first parameter vector using the extracted sequence of perturbation seeds, the sequence of mutations being in the order.

18. The non-transitory computer-readable storage medium of claim 15, wherein generating, by the source system, the encoded representation of the second parameter vector comprises:
   assigning a respective unique identifier to each mutation of the sequence of mutations; and
   denoting the sequence of perturbation seeds by listing a sequence of the respective unique identifiers in a manner corresponding to the order.

19. The non-transitory computer-readable storage medium of claim 18, wherein assigning the unique identifier to each mutation of the sequence of mutations further comprises mapping each unique identifier to a corresponding perturbation seed in an index.

20. The non-transitory computer-readable storage medium of claim 15, wherein generating, by the source system, the encoded representation of the second parameter vector comprises:
   assigning a unique identifier to each generation that fed into, or resulted from, a mutation;
   storing each respective perturbation seed as a respective array that indicates a respective unique identifier for a respective parent generation and a respective unique identifier for a respective child generation of a mutation caused by the respective perturbation seed; and
   generating the sequence of perturbation seeds using each respective array.

* * * * *